United States Patent
Engesser et al.

(10) Patent No.: US 7,699,529 B2
(45) Date of Patent: Apr. 20, 2010

(54) FLUID DYNAMIC BEARING HAVING PRESSURE-GENERATING SURFACE PATTERNS

(75) Inventors: Martin Engesser, Donaueschingen (DE); Stefan Schwamberger, Lohsa Ot. Hermsdorf (DE)

(73) Assignee: Minebea Co., Ltd., Nagano-ken (JP)

( * ) Notice: Subject to any disclaimer, the term of this patent is extended or adjusted under 35 U.S.C. 154(b) by 1173 days.

(21) Appl. No.: 11/292,739

(22) Filed: Dec. 2, 2005

(65) Prior Publication Data

US 2006/0133703 A1 Jun. 22, 2006

(30) Foreign Application Priority Data

Dec. 16, 2004 (DE) ............ 10 2004 060 540

(51) Int. Cl.
*F16C 17/00* (2006.01)
(52) U.S. Cl. ..................................... 384/115
(58) Field of Classification Search ............. 384/114, 384/120, 121, 123, 115
See application file for complete search history.

(56) References Cited

U.S. PATENT DOCUMENTS

| | | | |
|---|---|---|---|
| 4,141,603 A * | 2/1979 | Remmers et al. ............ 384/108 |
| 5,415,476 A | 5/1995 | Onishi | |
| 5,906,440 A | 5/1999 | Yoshitsugu | |
| 5,908,247 A | 6/1999 | Leuthold | |
| 5,911,512 A | 6/1999 | Lee | |
| 6,000,850 A | 12/1999 | Takahashi | |
| 6,379,047 B1 | 4/2002 | Lee | |

FOREIGN PATENT DOCUMENTS

| | | |
|---|---|---|
| DE | 1525190 | 3/1966 |
| JP | 10311330 | 11/1998 |
| JP | 2002070790 | 3/2002 |
| JP | 2002286026 | 10/2002 |

\* cited by examiner

*Primary Examiner*—William C Joyce
(74) *Attorney, Agent, or Firm*—Cooper & Dunham LLP

(57) ABSTRACT

A fluid dynamic bearing system having pressure-generating asymmetric surface patterns, having at least two bearing parts that are rotatable with respect to each other and form a bearing gap filled with a bearing fluid between associated bearing surfaces. The surface patterns are disposed on at least one bearing surface so that hydrodynamic pressure is generated within the bearing gap when the bearing parts rotate with respect to each other. Each surface pattern comprises at least three sections, each section generating a pumping action in a defined direction, and the pumping actions of adjacent sections being substantially aligned in opposite directions. Due to the special geometry of the surface patterns, tolerances in the geometry of the bearing gap have a less significant effect on the pre-defined pumping direction.

8 Claims, 3 Drawing Sheets

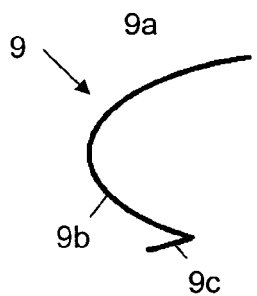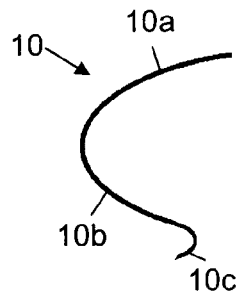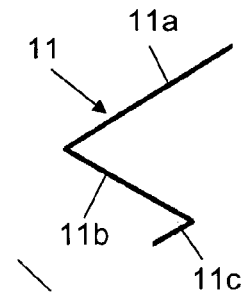
Fig. 3A  Fig. 3B  Fig. 3C
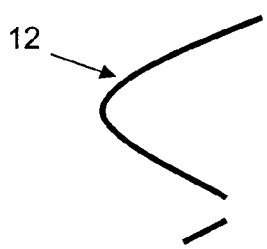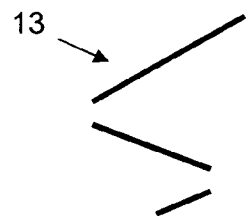
Fig. 4A  Fig. 4B
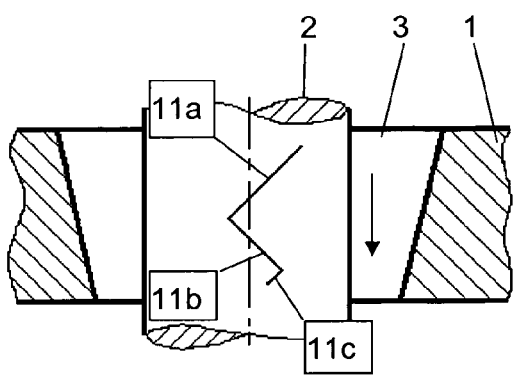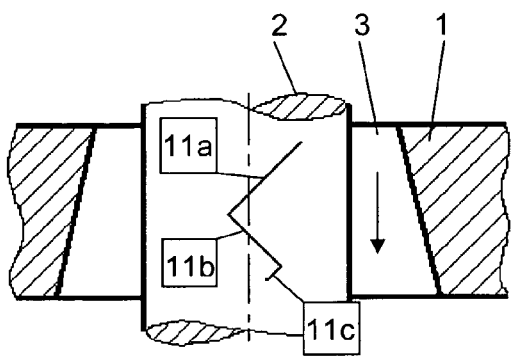
Fig. 5A  Fig. 5B

FLUID DYNAMIC BEARING HAVING PRESSURE-GENERATING SURFACE PATTERNS

BACKGROUND OF THE INVENTION

The invention relates to a fluid dynamic bearing, particularly a radial bearing, having pressure-generating surface patterns according to the characteristics outlined in the preamble of claim 1.

PRIOR ART

Fluid dynamic bearings generally comprise at least two bearing parts that are rotatable with respect to each other and form a bearing gap filled with a bearing fluid, e.g. air or bearing oil, between the associated bearing surfaces. Surface patterns that are associated with the bearing surfaces and that act on the bearing fluid are provided using a well-know method. In fluid dynamic bearings, the surface patterns taking the form of depressions or raised areas are usually formed on one or both bearing surfaces. These patterns formed on the appropriate bearing surfaces of the bearing partners act as bearing and/or pumping patterns that generate hydrodynamic pressure within the bearing gap when the bearing parts rotate with respect to each other. In the case of radial bearings, parabolic or herringbone patterns, for example, are used that are distributed perpendicular to the rotational axis of the bearing parts over the circumference of at least one bearing part.

In ideal fluid dynamic bearings, the gap filled with bearing fluid formed between the two bearing parts has the same width over its entire length. In actual bearings, however, deviations from this ideal form occur. The bearing partners are often conical in shape so that the width of the bearing gap increases or decreases over the length of the bearing.

Since the width of the bearing gap is one of the factors influencing the pumping action of the fluid dynamic surface patterns, differences in the width of the bearing gap give rise to pumping effects having different directions and strengths even where the surface patterns are perfectly symmetric.

FIG. 1 shows this effect using the example of a fluid dynamic radial bearing having a bearing sleeve 1 having a conical bore (exaggerated in the drawing) and symmetric surface patterns 4 that are depicted schematically on the outside circumference of the shaft 2. It could be assumed that when the shaft 2 rotates the symmetric patterns 4 generate the same pumping effect in both axial directions of the bearing gap 3. In actual fact, the sections of the patterns that are located in the narrower part of the bearing gap 3 generate a stronger pumping action than the sections of the patterns that are located in the wider part of the gap. As a result of this effect, a stronger pumping action is generated in the direction of the arrow 5 in the illustrated example causing the bearing fluid to be pressed upward parallel to the rotational axis 6 in the direction of the arrow 5.

In practice, a defined pumping direction and pumping strength is often required, and this can be achieved by the asymmetric pumping grooves illustrated in FIG. 2. Here, a section 7a of the exemplary parabolic pumping grooving 7 is longer than its opposing section 7b. The longer section 7a of the pattern generates a stronger pumping action than the shorter section 7b. This then results in a. pumping action primarily in the direction of the shorter section 7b, so that the bearing fluid is pressed in the direction of the arrow 8, starting from the longer section 7a toward the shorter section 7b of the pattern.

In actual bearing systems, the effect produced by the asymmetric design of the patterns (FIG. 2) is superimposed on the effect produced by the deviation in shape of the bearing partners as described above (FIG. 1). As a result of manufacturing tolerances for the bearing parts, this effect can cause the resulting pumping actions to vary greatly from bearing to bearing and under certain circumstances "negative" pressure could also be produced in regions of the bearing. To prevent this happening, it may be necessary to give the surface patterns a highly pronounced asymmetry to ensure a defined pumping direction, which, however, has a negative impact on the energy dissipation of the bearing.

SUMMARY OF THE INVENTION

It is thus the object of the invention to improve the shape of the pressure-generating surface patterns in a fluid dynamic bearing system such that the negative effects on the pumping action of the patterns caused by manufacturing tolerances are reduced.

This object has been achieved according to the invention by a bearing system having pressure-generating surface patterns according to the characteristics outlined in patent claim 1.

Preferred embodiments and other beneficial characteristics of the invention are cited in the subordinate claims.

The fluid dynamic bearing system having pressure-generating surface patterns comprises at least two bearing parts that are rotatable with respect to each other and form a bearing gap filled with a bearing fluid between the associated bearing surfaces. The surface patterns are arranged on at least one bearing surface so that when the bearing parts rotate with respect to each other, hydrodynamic pressure is generated within the bearing gap. According to the invention, each surface pattern comprises at least three sections, each section generating a pumping action in a defined direction and the pumping actions of adjacent sections being substantially directed in opposite directions.

The sections are preferably connected to each other and blend into one another. They could, however, be formed separately, in part or in full, and directly adjoin each other at a small spacing.

According to a first embodiment of the invention, the surface patterns consist of straight sections preferably lying adjacent to each other, which blend into one another at an acute angle.

In another embodiment of the invention, the surface patterns are made up of curved sections, the sections together forming an approximately S-shaped or serpentine pattern.

In a further embodiment of the invention, the surface patterns can be made up of curved and straight sections, the curved sections adjacent to each other approximately forming a parabolic shape and the straight section being connected to a curved section at an acute angle.

In general, the individual sections are provided with different lengths and generate a pumping action of varying strength in different directions. In particular, the pumping action of two sections that do not directly adjoin each other is aligned in the same direction.

The patterns can be given both an asymmetric as well as a symmetric design, the symmetric patterns having at least four sections.

The invention will now be explained in more detail on the basis of preferred embodiments with reference to the drawings described below. Further characteristics, advantages and possible applications of the invention can be derived from this.

BRIEF DESCRIPTION OF THE DRAWINGS

FIGS. 3: examples of pumping grooves according to the invention having split asymmetry;

FIGS. 4: examples of pumping grooves according to the invention having split asymmetry and separate sections;

FIGS. 5: schematic views of a fluid dynamic radial bearing having conical deviation from the cylinder form and a pumping grooving having split asymmetry

EXEMPLARY EMBODIMENTS OF THE INVENTION

Examples of patterns according to the invention are illustrated in FIGS. 3 to 6. When the geometry of the patterns is split, the influence of conical bearing partners can be compensated in part.

In the following, the directions are indicated by the terms left, right, upward and downward. These direction references apply to the drawings being viewed vertically.

Figure 1:
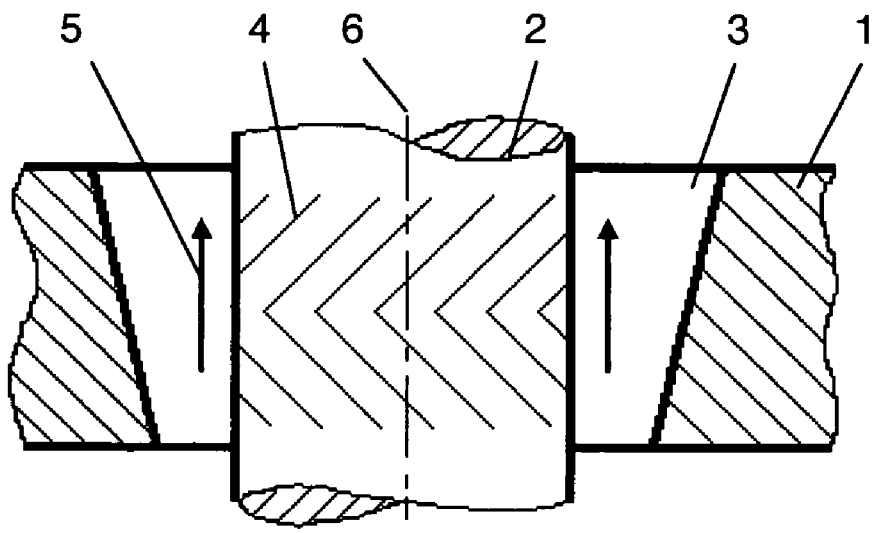
FIG. 1: a schematic view of a fluid dynamic radial bearing having a conical bearing bore and symmetric surface patterns on the shaft (prior art)
Figure 2:
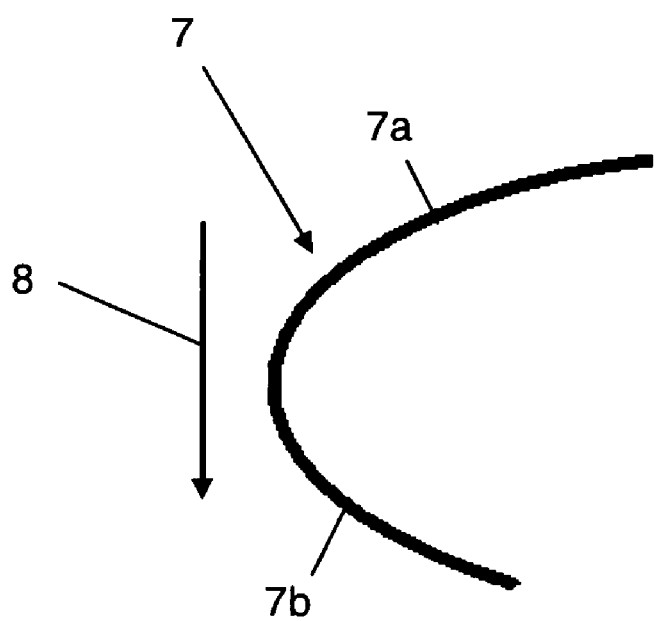
FIG. 2: an asymmetric parabolic pumping grooving (prior art)

FIG. 3A shows an asymmetric pattern 9, having two curved, parabolic sections 9a, 9b connected to one another and a straight section 9c affixed at an acute angle. If this pattern were to be formed on a shaft 2, for example, (see FIG. 1) and the shaft rotated towards the right, sections 9a and 9c each generate a downward pumping action, whereas section 9b generates an upward pumping action. In the case of a uniform bearing gap, the downward pumping action thus predominates since section 9b is shorter than sections 9a and 9c together.

FIG. 3B shows an asymmetric pattern 10 having two curved, parabolic sections 10a, 10b connected to one another and an affixed curved section 10c having a curve in the opposite direction. Sections 10a and 10c each generate a downward pumping action, whereas section 10b generates an upward pumping action. The downward pumping action predominates, assuming a uniform bearing gap.

FIG. 3C shows an asymmetric pattern 11 having three straight sections 11a, 11b and 11c, one connected to the other at an acute angle. Sections 11a and 11c each generate a downward pumping action, whereas section 11b generates an upward pumping action. The downward pumping action predominates.

In FIGS. 4A and 4B, patterns 12 or 13 having fully or partially separated sections are illustrated. The pumping action of these patterns corresponds to the effect produced by the patterns 9 or 11 of FIGS. 3A and 3C.

The effect produced by the patterns 11 are explained on the basis of FIGS. 5A and 5B. In practice, the conical bearing bore can deviate from the ideal cylinder form in two possible extremes (of course the shaft can conceivably deviate from the ideal cylinder form as well). In each case the bearing gap widens accordingly in one direction, either upward or downward. FIGS. 5A and 5B illustrate this situation.

Each figure shows a radial bearing consisting of a bearing sleeve 1 and a shaft 2. The bearing is so designed that the bearing fluid held in the bearing gap 3 is to be pressed predominantly downward.

In FIG. 5A, the surface pattern 11 generates a pumping action that is generally directed downward. However, the upward-widening bearing gap 3 generally generates an upward pumping action in the opposite direction. The upper section 11a of the surface pattern 11 according to the invention generates a downward pumping action. However, due to the upward-widening bearing gap 3, the upper section 11a of the pattern 11 produces a lesser effect than could be expected. In contrast, the lower section 11c of the pattern 11 is located in a region having a narrow bearing gap and also generates a downward pumping action that is larger than expected. Together with the pumping action of the upper section 11a, this pumping action is so strong that it compensates the effect of the upward pumping section 11b of the pattern 11 that is located in a region where the bearing gap narrows. Thus despite the irregular width of the bearing gap, the overall result is a predominantly downward pumping action as required, In FIG. 5B, the conditions in the bearing gap 3 are reversed since the bearing gap 3 narrows in an upward direction. The upper section 11a of the surface pattern 11 according to the invention generates a downward pumping action. However, due to the upward-narrowing bearing gap, the upper section 11a of the pattern 11 produces a greater effect than expected. In contrast, the lower section 11c of the pattern 11 is located in a region having a wide bearing gap and thus generates hardly any downward pumping action. The middle section 11b of the pattern 11 is located in a region where the bearing gap narrows and generates a relatively large upward pumping action. Despite the irregular width of the bearing gap, the overall result is again a predominantly downward pumping action as required.

FIG. 6 show examples of symmetric surface patterns 14, 15 for cases where it is not intended to give the bearing a defined pumping direction. The symmetric surface patterns 14, 15 are preferably employed in bearing regions in which the pressure in the bearing gap is greater than the atmospheric pressure.

Figure 6A:
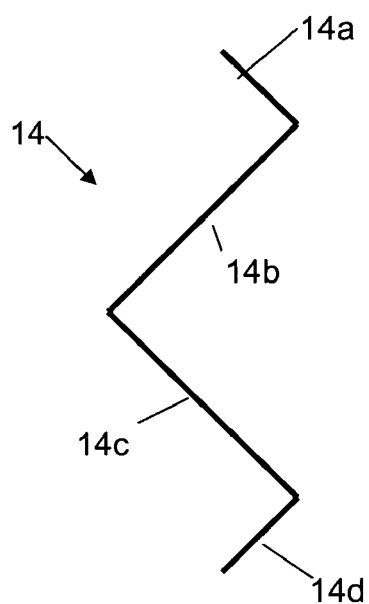
FIGS. 6: examples of symmetric pumping grooves according to the invention.

FIG. 6A shows a symmetric pattern 14 having four straight sections 14a-14b one connected to the other at an acute angle. The two longer sections 14b and 14c generate the same-sized pumping effect in opposite directions due to their identical lengths. The two outer, shorter sections 14a and 14d also generate a pumping effect of the same size in opposite directions, their pumping effect being smaller than the pumping effect of the longer sections. Sections 14a, 14c and 14b, 14d respectively have the same pumping direction, which as a whole cancel each other out.

Figure 6B:
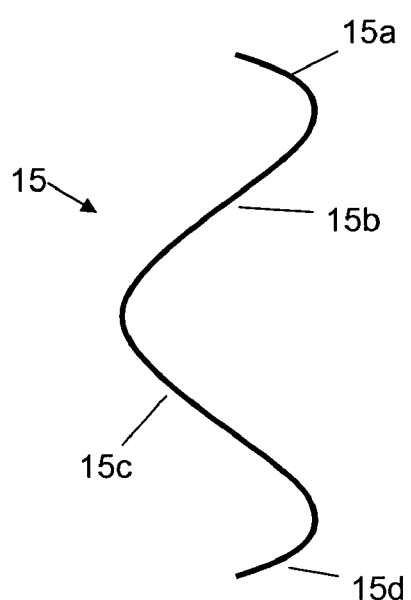

FIG. 6B shows a symmetric pattern 15 having two curved, parabolic sections 15b, 15c connected to one another and two curved sections 15a and 15d affixed to their free ends that are curved in the opposite direction to the longer sections 15b, 15c. Sections 15b and 15d each generate a downward pumping action, whereas sections 15a and 15c generate an upward pumping action. As a whole, the pumping actions cancel each other out in an axial direction when the bearing gap is uniform.

Since the surface patterns according to the invention are built up in sections, tolerances in the geometry of the bearing gap have a less significant effect on the pre-defined pumping direction.

IDENTIFICATION REFERENCE LIST

1 Bearing part (bearing sleeve)
2 Bearing part (shaft)
3 Bearing gap
4 Surface pattern (symmetric)
5 Direction of arrow
6 Rotational axis 7 Surface pattern (asymmetric)
7a Section
7b Section
8 Direction of arrow
9 Surface pattern (split asymmetric)
9a Section
9b Section
9c Section
10 Surface pattern (split asymmetric)
10a Section
10b Section
10c Section
11 Surface pattern (split asymmetric)
11a Section
11b Section
11c Section
12 Surface pattern (split asymmetric)
13 Surface pattern (split asymmetric)
14 Surface pattern (split symmetric)
14a Section
14b Section
14c Section
14d Section
15 Surface pattern (split symmetric)
15a Section
15b Section
15c Section
15d Section

The invention claimed is:

1. A fluid dynamic radial bearing having pressure-generating surface patterns, having at least two bearing parts (1, 2) that are rotatable with respect to each other and form a bearing gap (3) filled with a bearing fluid between associated bearing surfaces, the surface patterns being disposed on at least one bearing surface and generating hydrodynamic pressure within the bearing gap when the bearing parts rotate with respect to each other, each surface pattern (9; 10; 11; 12; 13) comprises at least three sections (9a,9b,9c; 10a, 10b, 10c; 11a, 11b, 11c), bent with respect to each other, each section having a different length compared to the length of the other sections and generating a pumping action in a defined direction, and the pumping actions of adjacent sections being substantially directed in opposite directions, the surface patterns (9; 10; 11; 12; 13) being developed asymmetrically and generating a pumping action substantially directed in one direction of the bearing gap (3), the different lengths of the at least three sections of each surface pattern decreasing in the one direction of the bearing gap (3), whereby there are at least three sections with the third section generating a pumping action equidirectional to the first section.

2. A fluid dynamic radial bearing according to claim 1, characterized in that the sections (9a, 9b, 9c; 10a, 10b, 10c; 11a, 11b, 11c) of the surface patterns (9; 10; 11) are connected to each other and blend into one another.

3. A fluid dynamic radial bearing according to claim 1, characterized in that the sections of the surface patterns (12; 13) are wholly or partly formed separately, and adjoin each other at a small spacing, such that the pumping action is nearly achieved by surface patterns connected to each other.

4. A fluid dynamic radial bearing according to claim 1, characterized in that the surface pattern (11) is made up of straight sections (11a, 11b, 11c).

5. A fluid dynamic radial bearing according to claim 1, characterized in that the surface pattern (10) is made up of curved sections (10a, 10b, 10c), the sections together forming an approximately S-shaped or serpentine pattern.

6. A fluid dynamic radial bearing according to claim 1, characterized in that the surface pattern (9) is made up of curved (9a, 9b) and straight (9c) sections, the curved sections adjacent to each other approximately forming a parabolic shape and the straight section follows a curved section.

7. A fluid dynamic radial bearing according to claim 1, characterized in that the individual sections of the patterns (9; 10; 11; 12; 13) are provided with different lengths.

8. A fluid dynamic radial bearing according to claim 1, characterized in that the individual sections of the patterns (9; 10; 11; 12; 13) generate a pumping action of varying strength in two different directions.

* * * * *